DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 374

T903,031

WAXING AND POLISHING OF SURFACES BY MEANS OF ABLATIVE WAXING COMPOSITIONS

Lee H. Davis, 4416 Briarwood Road, and Don R. Leonard, 1425 Warpath Drive, both of Kingsport, Tenn. 37662

Filed June 23, 1971, Ser. No. 155,961
**Int. Cl. A46b *11/00;* A47l *13/30***
U.S. Cl. 401—96
1 Sheet Drawing. 13 Pages Specification

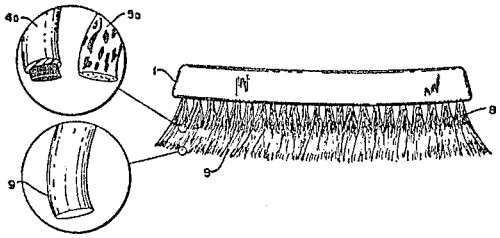

A bristled waxing and polishing brush, disk, buffing wheel or similar wax applicator in which all or a substantial portion of the bristles of which contain or are constructed of a composition made up of wax intimately mixed, blended or otherwise associated with a polymer matrix such as polyethylene, polypropylene, polyvinyl chloride, polyamides, polyesters, acrylics and other bristle forming polymers or the like, said applicator being specifically designed for deposition of the waxing component or components of the bristles onto a surface such as one composed of wood, metal, leather, plastic or the like followed by polishing to produce on such surface a durable, waterproof or water-resistant coating having any desired degree of polish or sheen. Deposition of the waxing component or components results from ablation or wearing down of the individual bristle structures themselves. After the wax-containing bristles have been substantially worn down in use by such ablative action, the waxing and polishing element can be discarded and readily replaced by a new unit of the same construction. The composition of which the bristles are composed may contain dyes, pigments, fillers or other desired additives.

Oct. 10, 1972 L. H. DAVIS ET AL T903,031
WAXING AND POLISHING OF SURFACES BY MEANS OF
ABLATIVE WAXING COMPOSITIONS
Filed June 23, 1971
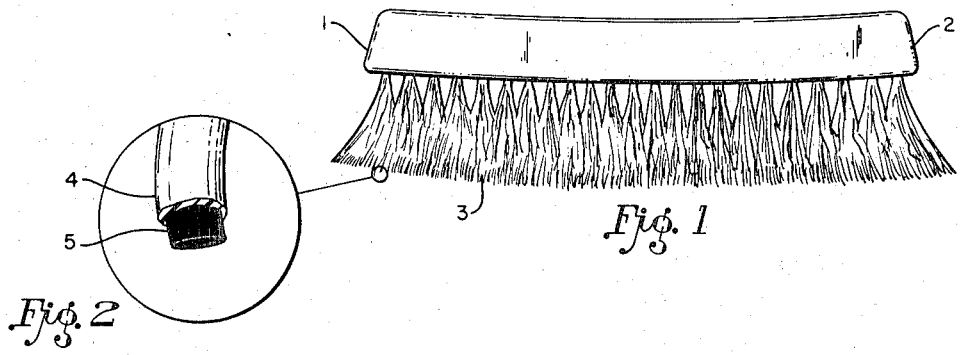
Fig. 1
Fig. 2
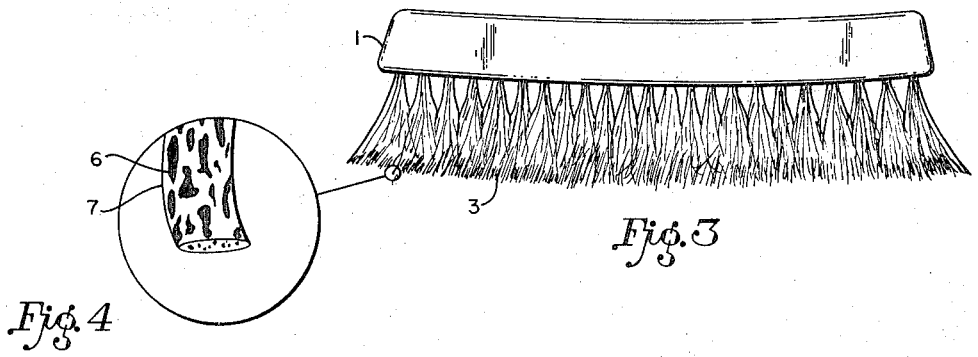
Fig. 3
Fig. 4
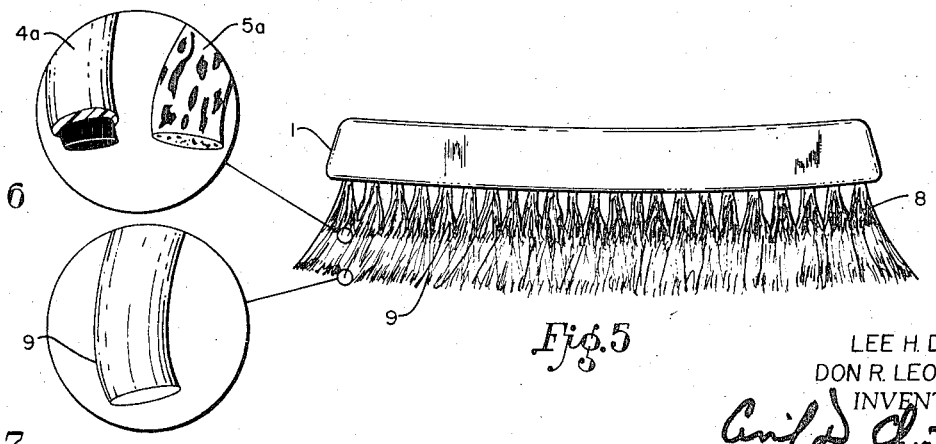
Fig. 6
Fig. 5
Fig. 7
LEE H. DAVIS
DON R. LEONARD
INVENTORS
BY
ATTORNEYS